United States Patent [19]

Thomason

[11] 4,048,812
[45] Sept. 20, 1977

[54] SOLAR-ENERGY CONSERVING

[76] Inventor: Harry E. Thomason,
609 Cedar Avenue,
Fort Washington, Md. 20022

[21] Appl. No.: 658,752

[22] Filed: Feb. 17, 1976

[51] Int. Cl.$^2$ ............................................. F25D 25/00
[52] U.S. Cl. .................................... 62/264; 219/485;
307/39; 307/117; 315/119
[58] Field of Search ............... 236/1 R; 315/119, 362;
307/135, 93, 52, 117, 57, 58, 31, 32, 33, 34, 35,
38, 39, 62; 219/485; 62/264, 331; 240/DIG. 6;
340/417, 422

[56] References Cited
U.S. PATENT DOCUMENTS

| | | | |
|---|---|---|---|
| 3,529,214 | 9/1970 | Corn | 307/117 |
| 3,984,699 | 10/1976 | Bailey | 307/117 |

*Primary Examiner*—William E. Wayner
*Assistant Examiner*—Robert J. Charvat

[57] ABSTRACT

Simplicity is the height of invention.

In order to conserve energy when the thermostat turns air conditioning apparatus on, in the present invention apparatus is employed to automatically reduce energy input to, and also heat output from, illuminating apparatus in the area being air conditioned. This is feasible because, in many instances, increased illumination from the sun, during daylight hours, renders the need much less for illumination from lamps or artificial luminares. In other instances, turning off a few lamps in each office can avoid blackouts, brownouts, overloading of generators, and burning out of air conditioning apparatus and other electrical appliances.

7 Claims, 4 Drawing Figures

SOLAR-ENERGY CONSERVING

BRIEF SUMMARY - BACKGROUND

As the sun comes up, the sun and the "sky" shine into homes, offices and other buildings or structures with windows. That does two important things:

1. It increases the heat in the buildings due to solar energy. That heat input is in the form of direct sunshine, reflected "sky" radiation, and solar radiation reflected through windows from all non-black objects around the buildings.

2. The rising sun increases the amount of natural light, so it decreases the need for artificial illumination for reading, working and so on.

On warm or hot days the air conditioning comes on early. Even on many cool or cold days of the hear, the combined effects of many air conditioning systems coming on in a given city or area overloads electric power generators, blows fuses, overloads transformers and causes blackouts, damage to electrical equipment, and so on. Often the electric power company can not produce enough electricity so it must reduce the voltage (power delivered) by 3% to 5% or more.

Those problems are unnecessary, in many instances, and energy is wasted for three reasons. 1. Energy is wasted in producing light (and heat) when natural outside light increases the light coming in through windows. 2. Energy is wasted for running air conditioning systems to pump the heat produced by the lamps to the outside. 3. The light that is shining on the occupants is converted to heat which warms their skin surfaces, making them feel too warm, so they turn the thermostat down to overcome that overheated feeling.

Someone could go through offices, homes, etc. turning off some of the lights to avoid over-lighting, and consequent overheating. But, that would require an engineer or maintenance man, at great cost. He would not be as reliable as simple automatic equipment actuated to do the job as taught in the present invention. This invention will cut out certain lamps, or otherwise lower the level of illumination in response to the air conditioning equipment coming on. In another form of the invention, artificial illumination may be decreased in response to air conditioning plus sunshine, sky radiation and reflected sunlight. Or, artificial illumination may be decreased during certain hours of the day or night while the air conditioner is on.

In view of the world-wide energy shortage, and high cost of energy, many persons would be willing to have the lighting level reduced somewhat below so-called "normal" levels during periods of peak power need for air conditioning. Some would be willing to avoid waste of energy that produces excess heat through lamps, plus wasting extra energy to pump the excess heat out, plus waste of energy to cool the skin that is over-warmed due to light from the lamp bulbs. Some would agree to having some of the lights turned out rather than overload generators, fuses, transformers, and such, and rather than endure blackouts, damaged equipment due to overloading, and so on.

So, no matter what the reason, many persons would agree that some lamps should be turned off, and the level of illumination reduced when air conditioning equipment comes on. This invention provides such feature, simply and automatically, without fail and without extra costs for a janitor, maintenance man, engineer, clean-up crew, or other.

IN THE DRAWING:

FIG. 1 is a simplified schematic of the invention.
FIG. 2 is a modification.
FIG. 3 is another modification. FIG. 4 is another modification.

DETAILED DESCRIPTION:

Figure 1:
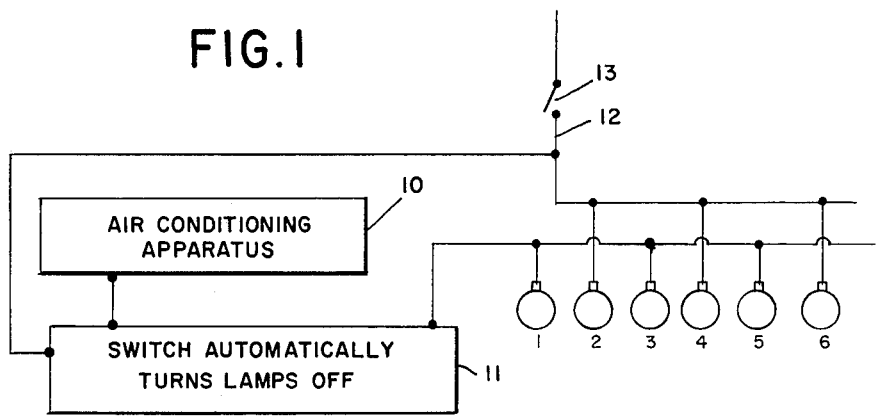

In FIG. 1 luminaires (light bulbs for example) are designated as 1, 2, 3, 4, 5 and 6. Luminares 1, 2, 3, 4, 5 and 6 may be turned on through wiring 12, by switch 13, in the normal manner. However, luminares 1, 3 and 5 may be connected through switching apparatus 11, controlled by air conditioning apparatus 10. The connections are simple. When the air conditioning turns on, luminares 1, 3 and 5 automatically go off, leaving luminares 2, 4 and 6 burning.

So, during the cold winter, at night, and when the air conditioner is off, all lights may be switched on by switch 13. During sunny days, as natural light through the windows helps brighten up the air conditioned area and the area is heated by sunshine and lights, the air conditioner automatically goes on and lamps 1, 3 and 5 automatically go off.

Obviously the number of lamps may be varied that will be wired to go off when the air conditioner turns on, and some rooms or offices may be wired so that all lamps will remain on at all times. Or, an EMERGENCY switch may be installed to by-pass switch 11 and cut lamps 1, 3 and 5 on for emergency use, or to satisfy an individual person's needs, or to pacify a nonconformist, an "old crank", or other.

As for selecting the particular lamps to be turned off, those nearest to windows, skylights and so on may be the first to go out. Natural light from outside keeps the level of illumination high enough anyway. Lamps that are somewhat unnecessary may also be wired to go off at the same time, or at an earlier or later time.

Figure 2:
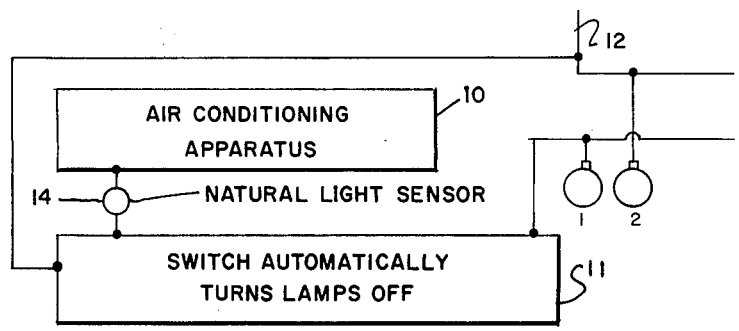

Fig. 2 takes the automatic invention a simple step further with a natural light sensor 14. In this embodiment the bank of lights to be turned off will stay on until natural light rises to a pre-determined level of brightness. That selected level could be chosen, for example, such that all of the lamps would provide a certain level of illumination and such that the same, or a similar level will be maintained by natural light plus lamps 2, 4 and 6 after switching apparatus 11 turns lamps 1, 3 and 5 off. That way, lamps will be automatically turned off when un-needed, when air conditioning is on. That prevents a double waste of energy; 1. for burning lamps that are unnecessary to maintain a desired level of illumination and ; 2. for operating air conditioning equipment to pump heat out that was created by unnecessary burning of lamps. Obviously sensor 14 may be pre-set for a level of illumination greater, or less, than "normal". Or, sensor 14 may be adjustable, to be set to "suit the boss". Additional sensors may be employed, if desired, set at various levels. Then, if the day is cloudy, a few lamps will go off. If the day brightens up, additional lamps will go off, etc.

Figure 3:
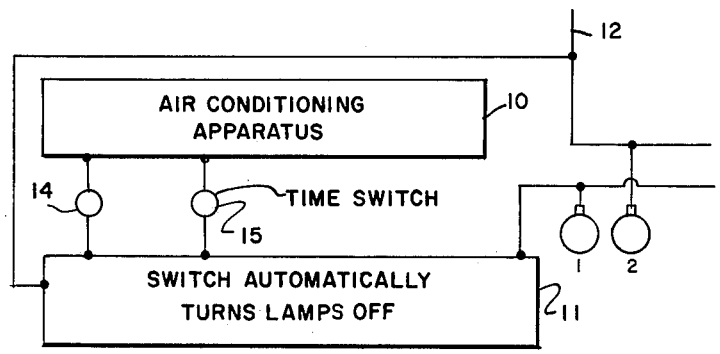

FIG. 3 takes the automatic simple invention a step further and makes it even more versatile. In addition to light sensor 14, time switch 15 may be set to automatically turn lamps 1, 3 and 5 off at any pre-set time, say at 5:00 P.M. after the work force has gone home, or wherever else they go after "work". Hopefully they will manually turn off lamps 2, 4 and 6 plus lamps 1, 3 and 5 by flipping switch 13 off. But, some employees are careless. Others just don't give a darn. Time switch 15 avoids much of the double energy loss. Of course, the time switch could be connected to automatically turn all lamps off, or all except one or two to avoid total darkness.

Alternatively, time switch 15 may be set to turn lamps 1, 3 and 5 off automatically for a pre-programmed period, say 12:00 to 1:00 P.M. while workers are out to lunch. Thus, even during dark cloudy days, when natural illumination may not cause natural light sensor 14 to turn lamps 1, 3 and 5 off, time switch 15 would turn them off at un-needed periods.

Switch 15 may operate on a 1-day cycle, as suggested above, or on a one-week cycle, or both. It may turn off some or all of the lamps on certain days, such as non-work days.

Figure 4:
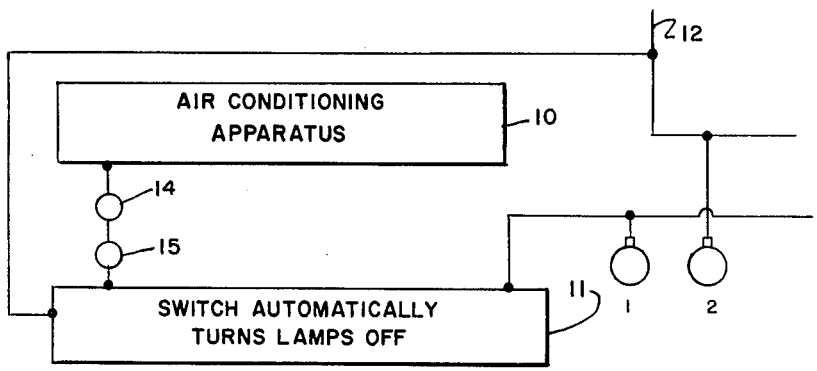

FIG. 4 illustrates a series connection of devices 14 and 15. That way, lamps 1, 3 and 5 will normally be on. They will not go off unless two things happen: 1. natural illumination is sufficient without those lamps and 2. the time switch allows lamp 1, 3 and 5 to go off.

The apparatus illustrated turns lamps 1, 3, 5, etc. on and off. However, it would be obvious that they could be gradually dimmed, or gradually brightened, or both, as desired, by simple automatic electrical, mechanical or electronic apparatus.

In buildings supplied with electrically through (peak) "demand" meters, electric bills will be cut substantially because the peak demand for air conditioning and a portion of the lamps will be much lower than for all of the lamps plus air conditioning. In buildings on a straight metered rate, the electric bills will be much lower because the number of kilowatts per month will be much lower. In either case, the electric power companies will be helped immensely because they will not have to keep extra generators standing by to meet peak loads, or have their equipment overloaded as air conditioning systems cut on across the country.

No matter what the type of lamp used, almost 100% of its energy becomes heat within the area where the lamps are used. With some types (e.g. flourescent lamps) heat is produced by lamp bulbs plus ballast, starters, etc. Incandescent lamps give off even more heat. In one large room with a dozen employees (more-or-less), the lamps can give off of-the-order-of 100,000 Btu from 8:00 A.M. to 5:00 P.M., every day. Air conditioning apparatus removes only about 12,000 Btu per hour for every horsepower used. Therefore, of-the-order-of 8½ horsepower is required each day just to pump out the heat generated in one large room by the lamps alone. So, the 100,000 Btu's are used for lamps, plus 8½ HP (100,000 Btu) additional for air conditioning, or 200,000 Btu total. If half of that can be saved by the present invention it is a saving of 100,000 Btu every day for a single office.

Most employees do not know these basic facts. Myths have been spawned and propogated about lamps, leading employees to believe that it makes very little difference whether lamps are left burning or not. So, most develop a don't-care attitude of let'er "burn, baby, burn". Some want to get even with the employer or the boss or, for other reasons just will not turn off lamps that are not needed.

With electricity costing only 2 to 4 cents per Kwh, the present invention can save many dollars per month. As the cost of electricity goes on up, the saving will be even greater. It also makes the air conditioner last longer, by running less. In new building installations there is a further saving; a smaller, less expensive air conditioner will handle the load.

Yes, simplicity is the height of invention. This extremely simple invention can save million of kilowatt hours of precious energy every day. In its simplest form (FIG. 1), it requires little more than a ten-dollar relay at 11, and the know-how taught herein. In a more sophisticated form (FIG. 2), a 10-dollar light sensor is added. For a really sophisticated system (FIG. 3 or FIG. 4), a ten-dollar time switch is added. Big energy savings at very low cost indeed. For large buildings having thousands of lamps the apparatus will be a little more expensive, and savings will be very great indeed.

In many existing buildings the electrician can change the existing wiring simply at the main "switchbox", at very low cost. In new buildings the cost is almost insignificant for installing the present invention.

I claim:

1. Energy-conserving apparatus comprising first means for air-conditioning an area, second means for illuminating said area, and third means interconnecting said first means and said second means to conserve energy by automatically reducing the level of illumination and energy consumption of said second means when said first means is energized and to reduce the heat energy output of said second means to thereby reduce the heat load on said first means.

2. Apparatus as in claim 1 wherein said second means comprises a number of illuminating devices and said third means substantially disables a portion of said illuminating devices to reduce the rate of energy consumption of said second means and to reduce the heat energy output of said second means.

3. Apparatus as in claim 1 wherein said third means comprises apparatus to lower energy input to said second means to thereby reduce the level of illumination and the rate of energy consumption of said second means to thereby reduce the heat energy output of said second apparatus.

4. Apparatus as in claim 1 and fourth means connected to said third means to sense the level of natural illumination to automatically reduce the level of artificial illumination proportionately.

5. Apparatus as in claim 1 and means connected to said third means to automatically reduce the level of artificial illumination for a period of time of a cycle and to automatically increase the level of illumination for another period of time of the cycle.

6. Apparatus as in claim 1 and means connected to said third means and in parallel to each other to automatically reduce the level of artificial illumination either due to an increase of natural illumination or for a period of time.

7. Apparatus as in claim 1 and means connected to said third means and in series with each other to automatically reduce the level of artificial illumination due to an increase of natural illumination and during a period of time.

* * * * *